United States Patent [19]

Dubrow et al.

[11] Patent Number: 4,777,063
[45] Date of Patent: Oct. 11, 1988

[54] CURABLE ORGANOPOLYSILOXANE COMPOSITION

[75] Inventors: Robert S. Dubrow, Redwood City; Catherine A. Dittmer, Mountain View, both of Calif.

[73] Assignee: Raychem Corporation, Menlo Park, Calif.

[21] Appl. No.: 935,088

[22] Filed: Nov. 24, 1986

Related U.S. Application Data

[63] Continuation of Ser. No. 730,402, May 2, 1985, abandoned.

[51] Int. Cl.$^4$ .............................................. B05D 3/06
[52] U.S. Cl. ....................................... 427/44; 427/55; 427/387; 428/447; 528/31; 528/24; 528/32; 522/99; 522/172
[58] Field of Search ............... 528/24, 32, 31; 427/44, 427/55, 387; 428/447; 522/99, 172

[56] References Cited

U.S. PATENT DOCUMENTS

| | | | |
|---|---|---|---|
| 3,624,022 | 11/1971 | Ross | 260/37 SB |
| 4,064,027 | 12/1977 | Gant | 204/159 |
| 4,163,081 | 7/1979 | Schulz | 428/260 |
| 4,196,273 | 4/1980 | Imai et al. | 528/15 |
| 4,322,320 | 3/1982 | Caprino | 528/32 |
| 4,364,809 | 12/1982 | Sato et al. | 204/159 |
| 4,463,127 | 7/1984 | Alberts et al. | 528/24 |
| 4,476,166 | 10/1984 | Eckberg | 528/32 |
| 4,487,906 | 12/1984 | Kniege et al. | 528/24 |
| 4,492,786 | 1/1985 | Evans et al. | 528/24 |
| 4,539,357 | 9/1985 | Bobear | 528/32 |

*Primary Examiner*—Melvyn I. Marquis
*Attorney, Agent, or Firm*—T. Gene Dillahunty

[57] ABSTRACT

The present invention provides novel curable organopolysiloxane composition comprising at least about 50% by weight of a general organopolysiloxane having no more than two vinyl groups and up to about 50% by weight of a crosslink additive which is a polysiloxane having at least three vinyl groups and is copolymerizable with the organopolysiloxane. This curable composition when cured by heat, chemical or, preferably, radiation curing techniques produces crosslinked polysiloxane materials having unique combinations of cone penetration, elongation and tensile strength properties. A preferred use for these materials is as a sealant.

17 Claims, 5 Drawing Sheets

FIG_1

FIG_2

FIG_3

FIG_4

FIG_5

FIG_6

FIG_7

CURABLE ORGANOPOLYSILOXANE COMPOSITION

This application is a continuation of application Ser. No. 730,402, filed May 2, 1985, now abandoned.

FIELD OF THE INVENTION

This invention relates to novel polysiloxane compositions and their preparation. More particularly the invention relates to novel compositions of general purpose organopolysiloxanes and a polysiloxane crosslink additive having at least three vinyl groups.

BACKGROUND OF THE INVENTION

Cured silicone products having a wide range of properties useful in a wide range of applications are well known, as is the formation of those products by curing organopolysiloxanes by crosslinking individual organopolysiloxanes or mixtures of various organopolysiloxanes. One particular family of organopolysiloxanes which are useful in forming adhesives and other materials are those diorganopolysiloxanes which are terminated at either or both ends of the chain with vinyl groups. Examples of such vinyl terminated polysiloxanes appear in U.S. Pat. No. 4,196,273 to Imai et al. Vinyl terminated polysiloxanes may be crosslinked with themselves or with other polysiloxanes containing various functional groups which are aryl, aliphatic (saturated or unsaturated), fluoroaliphatic (such as $CF_3CH_2CH_2-$) or containing other groups such as nitrogen groups, sulphur groups and the like. Examples of such organopolysiloxanes are shown in U.S. Pat. Nos. 3,624,022 to Ross, 4,064,027 to Gant, and 4,163,081 to Schultz.

Diorganopolysiloxanes terminated at the chain ends with two or three vinyl groups have been crosslinked to provide elastomeric or rubber-type products, as shown in U.S. Pat. No. 4,364,809 to Sato et al.

The disclosures of the above patents are incorporated herein by reference with respect to the conventional and general background relative to the types of organopolysiloxane materials which may be crosslinked, the methods of crosslinking polysiloxanes, the initiators used to initiate the crosslinking and other conventional aspects of the organopolysiloxane art.

In many end use applications it is desirable to use organopolysiloxane materials are sealants and as such the materials should preferably have a cone penetration of about 100 to about 350 ($10^{-1}$ mm) (ASTM No. D217-68) and an ultimate elongation of at least about 100% (ASTM No. D638-80). In many uses it is desirable to have elongation values as high as 800% or greater because of the extreme deformation the material must be capable of accommodating in order to effectively sal some substrates. it is also desirable to make such sealing materials from the most widely available and consequently lowest cost polysiloxanes, such as polydimethylsiloxanes, trimethylsiloxy terminated.

DESCRIPTION OF THE INVENTION

It has been found that mixtures of organopolysiloxanes having no vinyl unsaturation or at most to two vinyl groups and a polysiloxane crosslink additive having at least three vinyl groups can be crosslinked in certain proportions to provide materials of unique properties. In addition, the use of polysiloxane crosslink additive according to this invention provides certain advantages in manufacturing and processing efficiencies.

In one aspect this invention provides a curable composition comprising:

at least about 50% by weight of an organopolysiloxane having the general formula (I)

wherein each R is H or a substituted or unsubstituted monovalent hydrocarbon group free of aliphatic unsaturation, except that no more than two of the R groups may be $-CH=CH_2$ and n is a positive integer; and from about 0.5 to about 50% by weight of a polysiloxane crosslink additive having the general formula (II)

wherein each $R_1$, $R'_1$, $R_2$, $R'_2$, $R_3$ and $R'_3$ is H, $-CH=CH_2$ or a substituted or unsubstituted hydrocarbon group, at least three of which are $-CH=CH_2$, and n is a positive integer.

This invention provides a method of forming crosslinked polysiloxane materials ranging from soft elastomeric properties to rubber-like, high hardness properties. For some applications it is preferred that the material have a cone penetration of about 100 to about 300 ($mm^{-1}$) and an ultimate elongation of at least 100%.

In another aspect this invention provides a method comprising:

forming a mixture comprising at least about 50% by weight of an organopolysiloxane having the general formula (I) above, from about 0.5 to about 50% by weight of a divinyldimethyl organopolysiloxane having the general formula (II) above; and curing said mixture to the desired degree of crosslinking.

In another aspect, this invention provides a polysiloxane composition comprising:

an organopolysiloxane having the general formula (I) above, and from about 0.5 to about 50% by weight of a polysiloxane crosslink additive having the general formula (II) above, wherein the degree of crosslinking thereof is sufficient to provide a material having a cone penetration of about 100 to 350 (mm$^{-1}$), and an ultimate elongation of at least 100%.

The organopolysiloxane of general formula (I) useful in this invention, comprises any general purpose polysiloxane fluid conventionally available in the art having the appropriate substituents depending on the end use and properties generally desired in the crosslinked product. The organopolysiloxane should be a liquid at processing temperatures and should be compatible with the polysiloxane crosslink additive of general formula (II) above. A preferred organopolysiloxane is where all R groups are methyl. Another preferred organopolysiloxane is where at most two R groups are vinyl (provided both are not on the same siloxane group), most preferably one each on two separate backbone siloxane groups, and where some of the R groups are backbone siloxanes can be H. Another organopolysiloxane useful in this invention is where an R on an end group is methyl. The range of n can be from 1 to 10,000 or higher. In general n will be in the range of 1 to 5,000 and usually less than 1,000.

The polysiloxane crosslink additive general formula (II) above, provides the composition of this invention with unique properties when mixed with an organopolysiloxane of general formula (I) and the mixture cured to the desired level of crosslinking. In order to obtain a three-dimensional structure providing the unique properties of elongation, hardness and tensile strength, at least three of the R and/or R' groups on general formula (II) must be vinyl. These compounds are generically referred to herein as polysiloxane crosslink additives because having at least three vinyl groups. These polysiloxanes provide superior three-dimensional crosslinking in the overall structure of the cured product. In general, any polysiloxane crosslink additive of general formula (II) may be used in this invention provided it is compatible with the organopolysiloxane of general formula (I) at processing temperatures and conditions used to produce the desired mixture, crosslinking and resultant composition according to this invention. A preferred polysiloxane crosslink additive for use in this invention is where at least one end group is a divinylmethyl end group. At least one divinyl group may also be in the backbone of the polysiloxane. In either case, at least one other vinyl group must be present on the opposite end group or along the backbone of the polysiloxane in order to provide the three-dimensional type structures desired in this invention and to give the crosslinked materials the desired properties. When there are only three vinyl groups present, the third vinyl group in the polysiloxane crosslink additive may be on a silicone group adjacent to the divinyl group, but it is preferred that the third vinyl group be separated from the divinyl group by at least one siloxane group in order to provide better three-dimensional crosslinking of the materials according to this invention.

Preferred polysiloxane crosslink additives include polydimethylsiloxane methylvinyl siloxane copolymer, vinyldimethyl or trimethyl terminated having the general formula where R is H, $CH_3$, $-CH=CH_2$ or other substituted or unsubstituted monovalent hydrocarbon group, m and n are positive integers and having a molecular weight up to about 250,000. Other preferred crosslink additives include polydimethylsiloxane, divinylmethyl terminated having the formula where n is a positive integer and having a molecular weight up to about 250,000.

The proportion of the organopolysiloxane materials and the polysiloxane crosslink additives may vary from about 0.5 to about 50% by weight of the polysiloxane crosslink additive based on the combined weight of the two components. It is preferred to use between about 1% to about 15% by weight polysiloxane crosslink additive.

The curable compositions of this inventin may be cured by conventional methods of curing polysiloxanes containing vinyl unsaturation. Conventional curing and crosslinking methods include heat, chemical, ultraviolet light, and high energy radiation curing. Various catalysts and initiators are useful in accelerating the crosslinking. Heat curing can generally be done at temperatures of 50° C. to 250° C. and is generally aided by the inclusion of a curing catatalyst such as a peroxide, such as benzoylperoxide. The curable compositions of this invention may also be cured by UV light in the presence of photoinitiators such as benzophenone. Curing with high energy radiation, such as electron beam radiation or cobalt 60, is generally the preferred method for curing the compositions of this invention and can generally be accomplished in the range of 2 to 20 megarads. Such radiation curing may be done without initiators but accelerators, such as trialylcyanurate isocyanurate may be added. The compositions of this invention may be chemically cured by incorporating in the mixture certain compounds such as peroxides. It may also be desirable in some circumstances to combine two or more of these curing mechanisms to accomplish the desired curing in the desired time to achieve specific properties of the cured product.

The curable compositions of this invention and the cured compositions made according to this invention may contain various additional ingredients such as flame retardants, corrosion inhibitors, antioxidants, UV light stablizers, fungicides and other biocides, pigments, fillers to enhance or decrease thermal or electrical conductivity and fillers to adjust density or other physical properties. Such additives or fillers also may be used to regulate or affect the rate or extent of cure and crosslinking and affect the overall cost of the final composition.

The cured compositions of this invention have a wide variety of uses such as sealants, dielectrics, protective tapes and coatings. These materials can be combined with or cured on various substrates or in various devices to provide sealing, insulation or protective functions. These compositions are useful in such end uses as exemplified by copending applications U.S. Pat. Ser. No. 434,011 filed Oct. 12, 1982, now U.S. Pat. No. 4,600,261; U.S. Pat. Ser. No. 507,433 filed June 23, 1983, now abandoned; U.S. Ser. No. 507,435, filed June 23, 1983, now abandoned, and U.S. Pat. Ser. No. 688,849 filed Jan. 4, 1985, now U.S. Pat. No. 4,610,738. In many of these uses, the cured or crosslinked composition of this invention will have a cone penetration according to ASTM No. D271-68 of about 100 to about 350 $(mm^{-1})$ and an ultimate elongation in accordance with ASTM No. D638-80 of greater than about 200%.

The present invention can be illustrated by the following examples:

EXAMPLE 1

In this example, a polydimethylsiloxane, trimethyl terminated, commercially available as Dow 200 from Dow Corning, having a molecular weight 62,700 and a room temperature viscosity of about 10,000 centistokes was mixed separately with each of the following compounds:

| No. | Name | Molecular Weight | Viscosity (centistokes) |
|---|---|---|---|
| 1 | polydimethylsiloxane vinyldimethyl terminated (available from Petrarch Systems, silicone fluid No. PS443) | 28,000 | 1,000 |
| 2 | polydimethylsiloxane methylvinylsiloxane copolymer, trimethyl terminated (Formula III above)(Petrarch silicone fluid No. PS426) | 28,000 | 1,000 |
| 3 | polydimethylsiloxane divinylmethyl terminated (Formula IV above) (Petrarch silicone fluid No. PS483) | 28,000 | 1,000 |
| 4 | polydimethylsiloxane methylvinylsiloxane copolymer, vinyl dimethyl terminated (Formula III above) (Petrarch silicone fluid No. PS493) | 28,000 | 1,000 |

Figure 1:
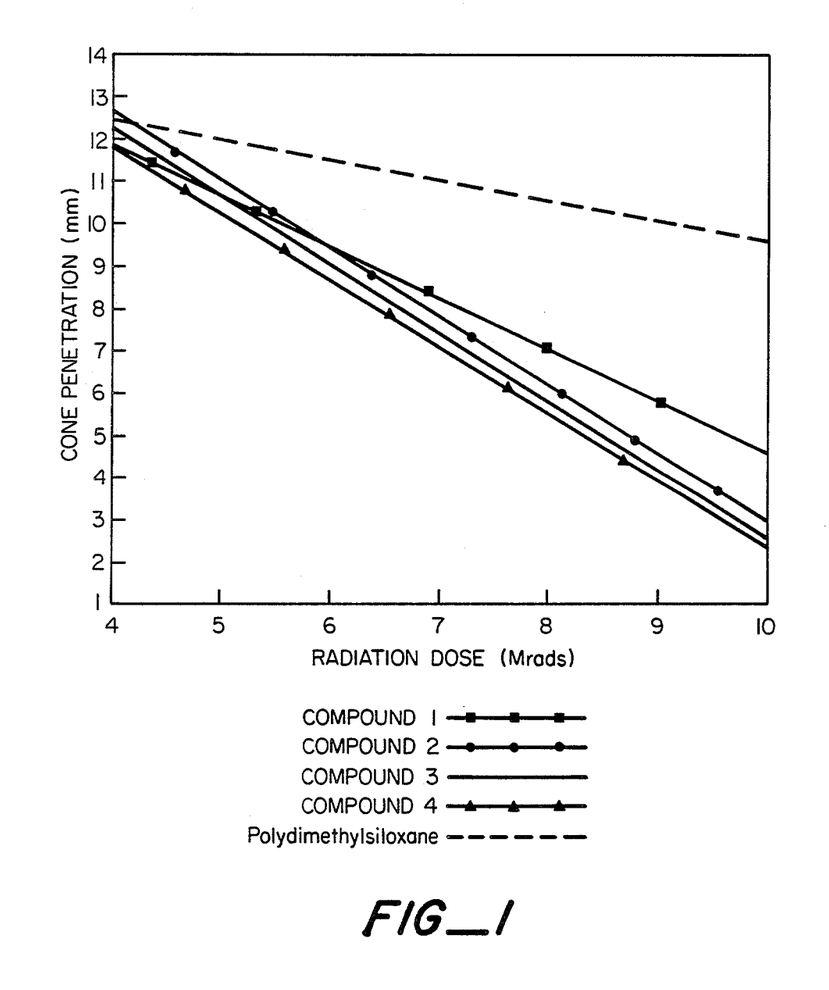
FIG. 1 shows the cone penetration versus radiation dose for the organopolysiloxane of Example 1.

Each of the mixtures contained 5% by weight of the above compound based on the combined weight of the two components. Each of the mixtures and a sample of the polydimethylsiloxane per se were cured by electron beam radiation using a 3.5 mev electron beam. Each of the samples was placed in a 10 ml beaker having diameter of 2.22 cm (0.875 in.) and subjected to the radiation doses shown in FIG. 1. The cone penetration of the crosslinked material was measured according to ASTM Standard No. D1403-69 and was recorded for the various radiation doses. The cone penetration versus the radiation dose for each of the five samples is shown in FIG. 1. This examples shows that the polysiloxane crosslink additives of this invention (Nos. 2, 3 and 4 above) increase the cure rate of the organopolysiloxane more than a divinyl compound (No. 1 above).

EXAMPLE 2

Figure 2:
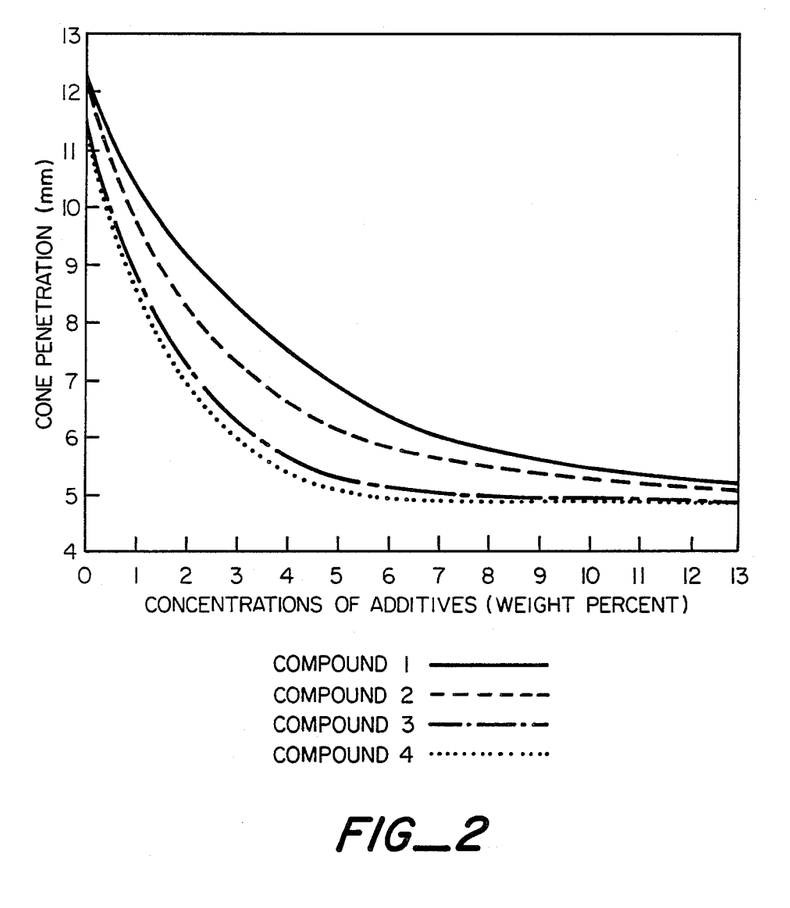
FIG. 2 shows the cone penetration versus concentration of additives of Example 2.

The same mixtures from Example 1 were prepared having different concentrations of compounds Nos. 1–4 varying up to 12%. Samples of each of the four mixtures and various concentrations were subjected to electron beam radiation dose of 8 megarads. The cone penetration of the resulting crosslinked composition was measured and recorded for each of the mixtures versus the proportion of each compound. The correlation of cone penetration with concentration is depicted in FIG. 2.

EXAMPLE 3

Figure 3:
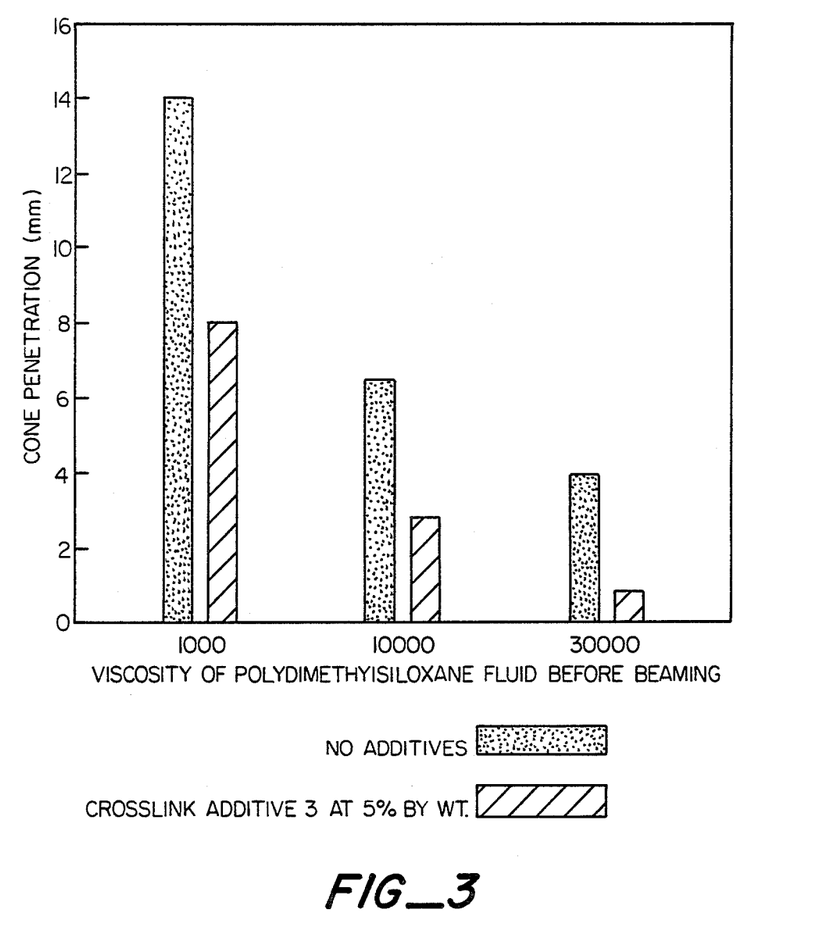
FIG. 3 shows the comparative cone penetration of polydimethylsiloxanes with and without the additive of Example 3.

In this example, three polydimethylsiloxane materials commercially available as Dow 200 from Dow Corning having a room temperature viscosities of 1,000, 10,000, and 30,000 centistokes, respectively, were mixed with 5% by weight of polydimethylsiloxane divinylmethyl terminated crosslink additive, No. 3 in Example 1. Each of these mixtures and corresponding samples of the polydimethylsiloxane without the additive were subjected to electron beam radiation dose of 15 megarads. The cone penetration of the resulting crosslinked composition was measured according to ASTM No. D1403-69. The relative cone penetration versus the beginning viscosity of the polydimethylsiloxane fluid with and without the crosslink additive is shown in FIG. 3.

EXAMPLE 4

In this example, the polydimethylsiloxane from Example 1 and mixtures thereof with 4% by weight polydimethylsiloxane divinylmethyl terminated, No. 3 in Example 1, were subjected to various electron beam radiation doses then the percent soluable material versus the percent gelled or crosslinked material was measured for each sample. The results are set forth below in Table 1.

TABLE 1

| Sol and Gel Values for Polydimethylsiloxane | | |
|---|---|---|
| Beam Dose | % Sol | % Gel |
| Polydimethylsiloxane with no additives: | | |
| 0 | 100 | 0 |
| 6.5 | 67.4 | 32.6 |
| 7.5 | 48.8 | 51.2 |
| 9.0 | 46.4 | 53.6 |
| 11.0 | 31.6 | 68.4 |
| Polydimethylsiloxane with 4% divinyl methyl terminated crosslink additive: | | |
| 0 | 100 | 0 |
| 5.0 | 57.2 | 42.8 |
| 6.0 | 49.0 | 51.0 |
| 6.5 | 45.2 | 54.8 |
| 7.5 | 40.9 | 59.1 |
| 9.0 | 33.3 | 66.7 |

EXAMPLE 5

In this example, polydimethylsiloxanes with and without polysiloxane crosslink additives were crosslinked and the resulting hardness and adhesion measured on a Voland-Stevens LFRA Texture Analyzer. Exactly 10 grams of liquid of each sample was placed in a standard 20 ml glass scintillation vial then cured. A 0.25 m ball probe was used to measure hardness and adhesion at a probe speed of 2.0 mm/sec. from a 4.0 mm penetration depth. The Dow 200 Polysiloxane Fluid from Example 1 with all methyl substitution has a room temperature viscosity of about 10,000. The samples of these polydimethyiloxanes with the amount of the crosslink additives from Example 4 indicated in the following table were cured during 1.5% benzoylperoxide at tempuerature of 150° C. under nitrogen for 1 hour. The resulting hardness and adhesion of the crosslinked material were measured in form on the Voland-Stevens Anaylzer as specified above and the results are shown in the following table.

TABLE 2

Hardness and Adhesion Values for polydimethylsiloxane with various vinyl functionalized additives.

| Sample | Hardness · g | Adhesion · g |
|---|---|---|
| Dow 200 fluid w/no crosslink additives | 3.4 | −8.0 |
| Dow 200 fluid w/polydimethylsiloxane divinylmethyl terminated | 10.1 | −11.7 |
| Dow 200 fluid w/vinyl dimethyl polydimethylsiloxane vinyldimethyl terminated | 7.7 | −10.9 |
| Dow 200 fluid w/methyl polydimethylsiloxane methylvinyl copolymer vinyldimethyl terminated | 8.4 | −8.9 |

EXAMPLE 6

Figure 4:
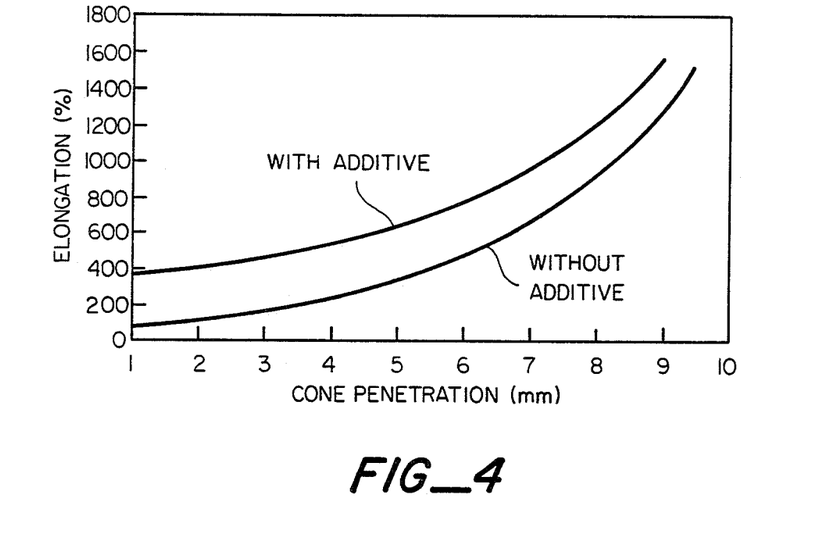
FIGS. 4, 5 and 6 show the elongation versus cone penetration for the polydimethylsiloxanes of Example 6.

In this example three comparative samples were prepared using 100 parts by weight in each of a Dow 200, Dow Corning, polydimethylsiloxane, trimethylterminated having a viscosity of 10,000 centistokes at room temperature. In the first comparative sample 5 parts of a polydimethylsiloxane, divinylmethyl terminated crosslink additive, compound PS483, from Petrarch Systems, having a viscosity of 1,000 centistokes was used. The resultant elongation versus cone penetration curves as shown in FIG. 4.

Figure 5:
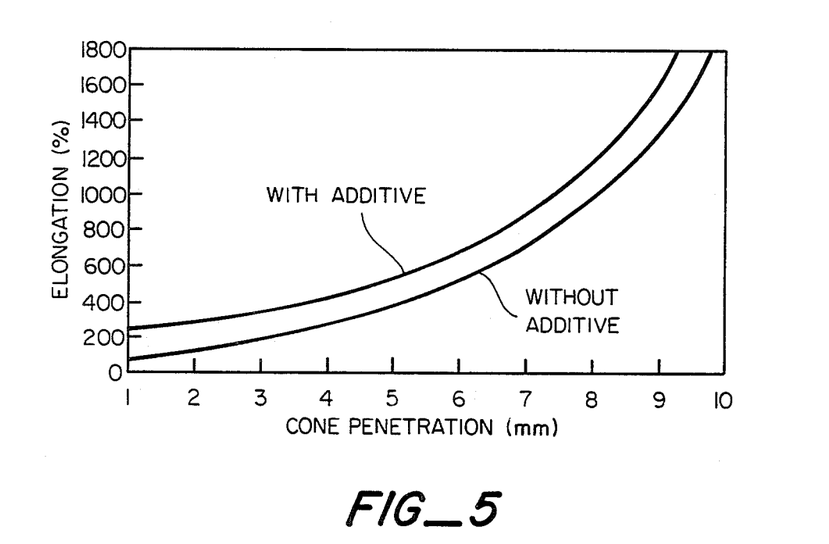

In the second comparative sample 5 parts of a polydimethyl/(1%) covinylmethylsiloxane, trimethyl terminated crosslink additive, compound PS426 from Petrarch Systems, having a viscosity of 1,000 centistokes, was used. The resultant elongation versus cone penetration curves are shown in FIG. 5.

Figure 6:
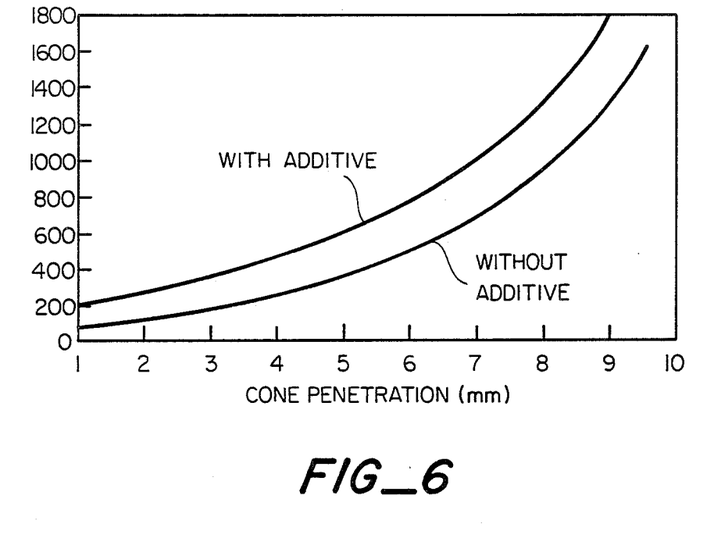

In the third comparative sample 5 parts of a polydimethyl/(1%) covinylmethyl siloxane, dimethylvinyl terminated crosslink additive, compound PS493 from Petrarch Systems, having a viscosity of 1,000 centistokes was used. The resultant elongation versus cone penetration curves are shown in FIG. 6.

All samples were cured using varying amounts of benzoyl peroxide, from 0.5% to 2.0%, to vary the cone penetration of the resulting material. Curing was at 150° C. under nitrogen for 1 hour. Cone penetration is measured according to ASTM No. D1403-69 and elongation measured according to ASTM No. 412.

This example shows that this invention provides superior elongation properties for given hardness properties.

EXAMPLE 7

Figure 7:
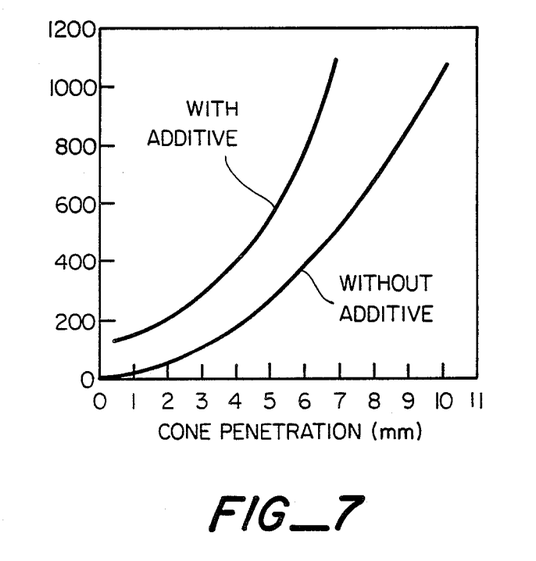
FIG. 7 shows the elongation versus cone penetration of the organopolysiloxane of Example 7.

In this example the mixture containing the crosslink additive from the first comparative sample of Example 6 was radiation cured under a 3.5 Mev electron beam at radiation doses from 5 to 11 megarads to vary the cone penetration. The elongation versus cone penetration for this mixture measured as in Example 6 is shown in FIG. 7 as the curve "w/Additive."

Next a two-part organopolysiloxane system of polyvinyl methylsiloxane and polymethyl hydridesiloxane containing a platinum catalyst, KE104 Gel from Shin-Etsu, was cured at 150° C. in air for varying periods of time to vary the cone penetration. The elongation versus cone penetration for this material measured as in Example 6 is shown in FIG. 7 as the "w/o Additive" curve.

This example illustrates that the crosslink additives of this invention produce materials having superior elongation properties using standard polysiloxane fluids like Dow 200, compared to more expensive systems which have very good elongation characteristics.

We claim:

1. A curable composition capable of forming a crosslinked polysiloxane having a cone penetration of about 100 to about 350 $10^{-1}$ mm) and an ultimate elongation of at least about 100% comprising a mixture of:
   (a) at least about 50% by weight of an organopolysiloxane having the general formula wherein each R individually is H, $-CH=CH_2$ or a substituted or unsubstituted monovalent hydrocarbon group free of aliphatic unsaturation, provided that no more than two of the R groups are $-CH=CH_2$ and n is a positive integer;
   (b) from about 1 to about 15% by weight of a polysiloxane crosslink additive having the general formula wherein each $R_1$, $R'_1$, $R_2$, $R'_2$, $R_3$ and $R'_3$ is H or a substituted or unsubstituted hydrocarbon group, wherein at least three of said R or R' groups are $-CH=CH_2$, and n is a positive integer; and
   (c) a curing initiator or accelerator for heat, chemical or radiation curing.

2. A composition according to claim 1 wherein $R_1$ and $R'_1$ are $-CH=CH_2$.

3. A composition according to claim 2 wherein $R_3$ and $R'_3$ are $-CH=CH_2$.

4. A composition according to claim 2 wherein each R is H, methyl, methylol or $-CH=CH_2$.

5. A composition according to claim 3 wherein each R is H, methyl, methylol or $-CH=CH_2$.

6. A composition according to claim 1 wherein the initiator is a photoinitiator for curing with ultraviolet light.

7. A composition according to claim 1 wherein the accelerator is trialylcyanurate for curing with an electron beam.

8. A method of forming a crosslinked polysiloxane comprising:
   forming a mixture comprising at least about 50% by weight of an organopolysiloxane having the general formula (I)

wherein each R individually is H, or —CH=CH$_2$ or a substituted or unsubstituted monovalent hydrocarbon group free of aliphatic unsaturation, provided that no more than two of the R groups are —CH=CH$_2$ and n is a positive integer; and from about 1 to about 15% by weight of a polysiloxane crosslink additive having the general formula (II)

wherein each $R_1$, $R'_1$, $R_2$, $R'_2$, $R_3$ and $R'_3$ is H or a substituted or unsubstituted hydrocarbon group, wherein at least three of said R or R' groups are —CH=CH$_2$, and n is a positive integer; and curing said mixture to provide a crosslinked polysiloxane having a cone penetration of about 100 to about 350 ($10^{-1}$ mm) and an ultimate elongation of at least about 100%.

9. A method according to claim 8 wherein a curing initiator is used.

10. A method according to claim 8 wherein the initiator is a photoinitiator or a peroxide.

11. A polysiloxane composition having a cone penetration of about 100 to about 350 ($10^{-1}$ mm) and an ultimate elongation of at least about 100% and comprising (I)

wherein each R individually is H, —CH=CH$_2$ or a substituted or unsubstituted monovalent hydrocarbon group free of aliphatic unsaturation, provided that no more than two of the R groups are —CH=CH$_2$ and n is a positive integer crosslinked with:

from about 1 to about 15% by weight of a polysiloxane crosslink additive having the general formula (II)

wherein each $R_1$, $R'_1$, $R_2$, $R'_2$, $R_3$ and $R'_3$ is H or a substituted or unsubstituted monovalent hydrocarbon group, wherein at least three of said R or R' groups are —CH=CH$_2$ and n is a positive integer.

12. A composition according to claim 11 wherein $R_1$ and $R'_1$ are —CH=CH$_2$.

13. A composition according to claim 11 wherein each R is H, methyl, methylol or —CH=CH$_2$.

14. A composition according to claim 11 wherein R is H, methyl, methylol or —CH=CH$_2$.

15. A method of protecting a substrate comprising applying to the substrate a curable composition comprising:

at least about 50% by weight of an organopolysiloxane having the general formula (I)

wherein each R individually is H, —CH=CH$_2$ or a substituted or unsubstituted monovalent hydrocarbon group free of aliphatic unsaturation, provided that no more than two of the R groups are —CH=CH$_2$ and n is a positive integer; and from about 1 to about 15% by weight of a polysiloxane crosslink additive having the general formula (II)

wherein each $R_1$, $R'_1$, $R_2$, $R'_2$, $R_3$ and $R'_3$ is H or a substituted or unsubstituted hydrocarbon group, wherein at least three of said R or R' groups are —CH=CH$_2$, and n is a positive integer; and curing said composition to have a cone penetration of about 100 to about 350 ($10^{-1}$ mm) and an ultimate elongation of at least about 100%.

16. A method of protecting a substrate comprising applying to the substrate a composition having a cone penetration of about 100 to about 350 ($10^{-1}$ mm) and an ultimate elongation of at least about 100% and comprising a polysiloxane composition comprising:

(I)

wherein each R individually is H, —CH=CH$_2$ or a substituted or unsubstituted monovalent hydrocarbon group free of aliphatic unsaturation; provided that no more than two of the R groups are —CH=CH$_2$ and n is a positive integer crosslinked with:

from about 1 to about 15% by weight of a polysiloxane crosslink additive having the general formula (II)

wherein each $R_1$, $R'_1$, $R_2$, $R'_2$, $R_3$ and $R'_3$ is H or a substituted or unsubstituted monovalent hydrocarbon group, wherein at least three of said R or R' groups are —CH=CH$_2$ and n is a positive integer.

17. An article comprising a substrate having disposed thereon a composition having a cone penetration of about 100 to about 350 ($10^{-1}$ mm) and an ultimate elongation of at least about 100% and comprising a polysiloxane composition comprising:

(I)

wherein each R individually is H, —CH=CH$_2$ or a substituted or unsubstituted monovalent hydrocarbon group free of aliphatic unsaturation, provided tht no more than two of the R groups are —CH=CH$_2$ and n is a positive integer crosslinked with:

from about 1 to about 15% by weight of a polysiloxane crosslink additive having the general formula (II)

wherein each R$_1$, R'$_1$, R$_2$, R'$_2$, R$_3$ and R'$_3$ is H or a substituted or unsubstituted monovalent hydrocarbon group, wherein at least three of said R or R' grops are —CH=CH$_2$ and n is a positive integer.

* * * * *